Jan. 31, 1967  F. W. GRAHAME  3,302,081

CAPACITOR ASSEMBLY WITH HIGH RESISTANCE SHUNT

Filed Sept. 30, 1965

CONDUCTIVE PARTICLES

CONDUCTIVE PARTICLES

INVENTOR:
FREDERICK W. GRAHAME,

BY *Harold A. Levey, Jr.*

HIS ATTORNEY.

United States Patent Office 3,302,081
Patented Jan. 31, 1967

3,302,081
CAPACITOR ASSEMBLY WITH HIGH RESISTANCE SHUNT
Frederick W. Grahame, Fort Edward, N.Y., assignor to General Electric Company, a corporation of New York
Filed Sept. 30, 1965, Ser. No. 491,657
2 Claims. (Cl. 317—256)

This invention relates to electrical capacitor assemblies and more specifically to electrical capacitor assemblies which have a high resistance shunt between the capacitor terminals.

The use of high resistance shunts to dissipate undesirable voltage between capacitor terminals is well known in the art. Typically, the undesirable voltage may be residual voltage remaining when an external power source is removed or excessive voltage resulting from a sudden surge of power. In any event the undesirable voltage may be dissipated by a resistive element between the capacitor terminals. Obviously, it is essential that the conductive element also be highly resistive in order to avoid dissipating unnecessarily large amounts of power.

A resistor connected in parallel with the capacitor is a common type of high resistance shunt used for dissipating undesirable capacitor voltage. In smaller capacitor assemblies, this resistor is located outside the capacitor housing. In such arrangements, not only is the resistor unprotected, but the resistor-capacitor assembly is cumbersome. Even if the capacitor housing is designed so that the resistor may be located within the capacitor housing, the assembly still has the inherent disadvantage associated with the addition of a separate element in the capacitor structure or circuit to accomplish the voltage dissipative function. The incorporation of this separate element, the high resistance shunt, requires an extra fabrication step and renders the assembled capacitor unnecessarily expansive.

It has also been proposed to attach a carbon-impregnated paper between the plates of an electrical capacitor to dissipate undesirable voltage. As in the more common forms of high resistance capacitor shunts described in the preceding paragraph, the carbon-impregnated paper is a separate element in the capacitor structure and also renders the structure difficult to fabricate and unnecessarily expensive. When located between the plates of the capacitor, the carbon-impregnated paper dissipates an abnormal amount of heat in the active dielectric region of the capacitor and thereby shortens the life of the nearby dielectric.

It is an object of the present invention to eliminate the need for a separate high resistance shunt element in an electrical capacitor assembly having a means for dissipating undesirable voltage.

It is a further object of the present invention to provide an electrical capacitor assembly having a voltage dissipating means integrally associated with another element of the capacitor assembly.

Briefly stated, in accordance with one aspect of this invention, the voltage dissipative resistor commonly associated with electrical capacitors is eliminated by the provision, in the capacitor assembly, of an insulating member which is in contact with the capacitor terminals and which is adapted to function also as a high resistance shunt between the terminals. The insulating member is adapted to the latter function either by the use of a slightly conductive structural material, such as insulating material with a filler of conductive particles, or by the use of a conductive coating on the surface of the insulating member. In the preferred embodiment of the present invention, a conductive material layer and the insulating member comprise a laminate of insulating and conductive materials.

The insulating member-high resistance shunt may be interposed between a capacitor and a conductive capacitor housing. Alternatively, if the capacitor housing is a non-conductive material, the portion of the housing between the capacitor terminals may serve both as an insulating member and as a high resistance shunt. In any event, where a conductive coating or layer is used, the surface on which the conductive material is disposed, is located within the capacitor housing.

The present invention is particularly applicable to capacitor assemblies having housings comprised of a container and a container cover. In these assemblies the capacitor terminals usually project through the container cover. The insulating member with which the conductive material is combined, may be either an element associated with the container cover or it may comprise the container cover itself, if the cover is composed of a non-conductive material.

While the specification concludes with claims particularly pointing out and distinctly claiming the subject matter of the present invention, it is believed that the invention will be better understood from the following description taken in conjunction with the accompanying drawings in which:

Figure 1:
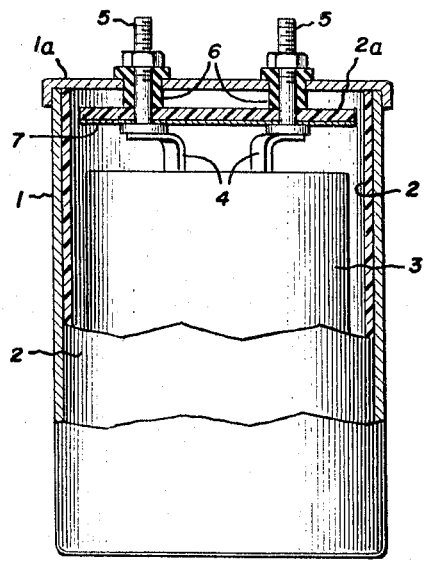
FIGURE 1 is an elevation view, partially in section, of the preferred embodiment of the present invention.

Referring more specifically to FIGURE 1, there is shown the preferred embodiment of the present invention. The capacitor assembly in this embodiment includes a housing made up of a container 1 and a cover 1a. This housing is electrically insulated from the capacitor by insulating material comprised of container insulation 2 and an insulating member 2a, which is located in spaced relationship to the cover 1a. A capacitor 3 is connected by tap straps 4 to capacitor terminals 5 which project through the cover 1a and insulating member 2a. Insulating bushings 6 prevent electrical contact between the capacitor terminals 5 and the cover 1a.

A conductive material 7 is shown disposed on a surface of a planar insulating member 2a. The conductive material 7 may be laminated, coated, printed, or impregnated on either surface of the insulating member 2a. In the preferred form of the present invention, the insulating member 2a and the conductive material 7 comprise a laminate having an insulating paper lamina as the insulating member and a conducting paper lamina as the high resistance conductive material. An ordinary paper having conductive particles, such as carbon, incorporated therein to impart a conductive characteristic to the paper is a suitable conductive paper for this purpose.

Figure 2:
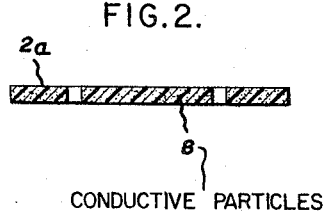
FIGURE 2 is a detailed view of another embodiment of one element of the capacitor assembly shown in FIGURE 1.

FIGURE 2 illustrates another embodiment of the present invention in which the insulating member 2a of FIGURE 1 has incorporated therein conductive material or particles 8 which render the insulating member slightly conductive and permit it to function both as an insulating member and as a high resistance shunt.

Figure 3:
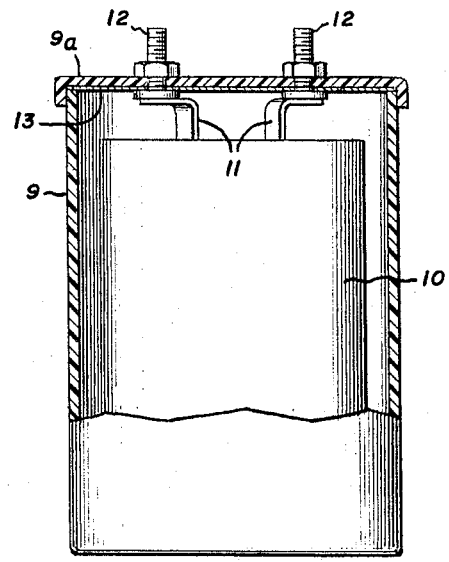
FIGURE 3 is an elevation view, partially in section, of another embodiment of the present invention.

In FIGURE 3, a capacitor assembly is shown which includes a housing similar to that shown in FIGURE 1. This housing, comprised of a container 9 and a cover 9a, is composed of a non-conductive material, such as plastic. The housing encloses a capacitor 10 connected by tap straps 11 to capacitor terminals 12 which extend through the cover 9a. A conductive material 13 is disposed on the inner surface of the cover 9a. Coating, impregnating, printing, and laminating are typical methods for placing the conductive material on the surface of the cover.

Figure 4:
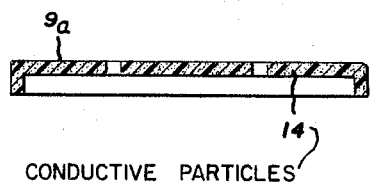
FIGURE 4 is a detailed sectional view of one embodiment of the capacitor assembly cover shown in FIGURE 3.

FIGURE 4 illustrates an embodiment of the present invention in which the insulating cover 9a of FIGURE 4 has incorporated therein conductive material or particles 14 which render the cover slightly conductive and permit it to function both as an insulating member and as a high resistance shunt.

In all forms of the present invention, the conductive material, which serves as the shunt in the capacitor assembly, must form a sufficiently high resistance to prevent dissipation of unnecessarily large amounts of power.

Numerous advantages are realized in capacitor assemblies within the scope of the present invention, as opposed to those of the prior art. For example, the conductive material coating, lamina, or filler used as a high resistance shunt in the present invention occupies practically no space in the capacitor assemblies. Conpact capacitor assemblies may thus be produced. A second advantage accruing to capacitor assemblies of the present invention is that fabrication of these assemblies is facilitated by the simplicity of combining the high resistance shunt, as a coating, lamina, or filler with insulating members of the assemblies. Savings in time and cost of manufacturing these assemblies are the beneficial results of this advantage.

A further advantage of the present invention is that by placing the conductive material-high resistance shunts either on surfaces within the capacitor housings or in the structural material of an insulating member, the voltage dissipative elements are protected from adverse environment and undesirable physical contacts which might interfere with proper operation of the high resistance shunts.

While I have shown and described certain embodiments of my invention, it is to be understood that it is capable of many modifications. Changes, therefore, in the construction and arrangements may be made without departing from the spirit and scope of this invention as recited in the appended claims.

What I claim as new and desire to secure by Letters Patent of the United States is:

1. An electrical capacitor assembly comprising a housing with an opening therein, a capacitor within said housing, a cover for said opening, a planar laminated member interposed between said capacitor and said cover, terminals connected to said capacitor and extending through said cover and said planar laminated member, said laminated member having conductive and non-conductive lamina wherein said conductive lamina is paper having conductive particles therein.

2. An electrical capacitor assembly comprising a housing with an opening therein, a capacitor within said housing, an electrically insulating cover for said opening, and terminals connected to said capacitor and extending through said cover, said cover comprising a mass of insulating material with conductive particles dispersed throughout said mass.

References Cited by the Examiner

UNITED STATES PATENTS

| | | | |
|---|---|---|---|
| 1,563,754 | 12/1925 | Latour | 317—256 X |
| 3,024,393 | 3/1962 | Ferrante | 317—242 |
| 3,197,547 | 7/1965 | Peace | 317—242 X |
| 3,198,997 | 8/1965 | Fabricius | 317—242 |

FOREIGN PATENTS 638,288   3/1962   Canada.

LEWIS H. MYERS, *Primary Examiner.*

E. GOLDBERG, *Assistant Examiner.*